UNITED STATES PATENT OFFICE.

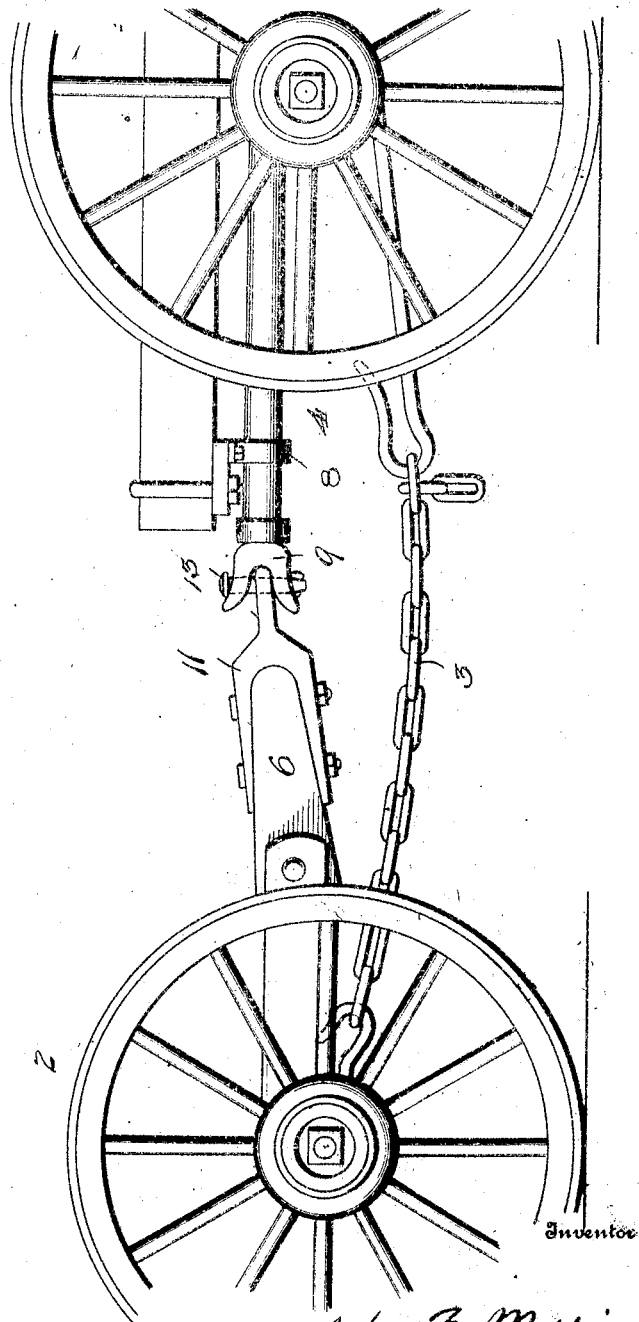

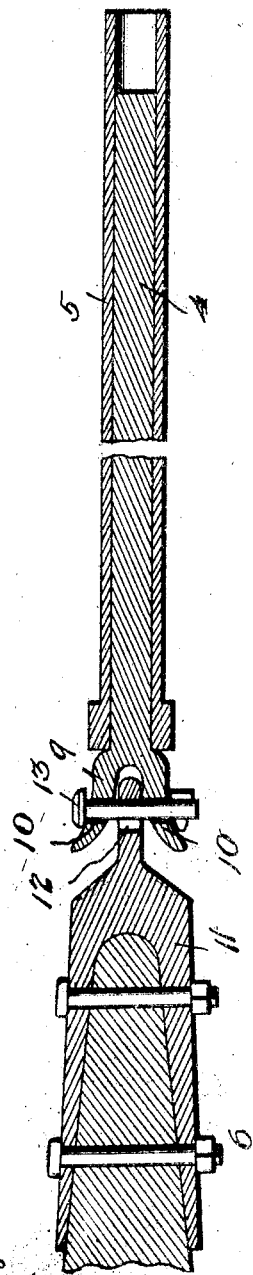
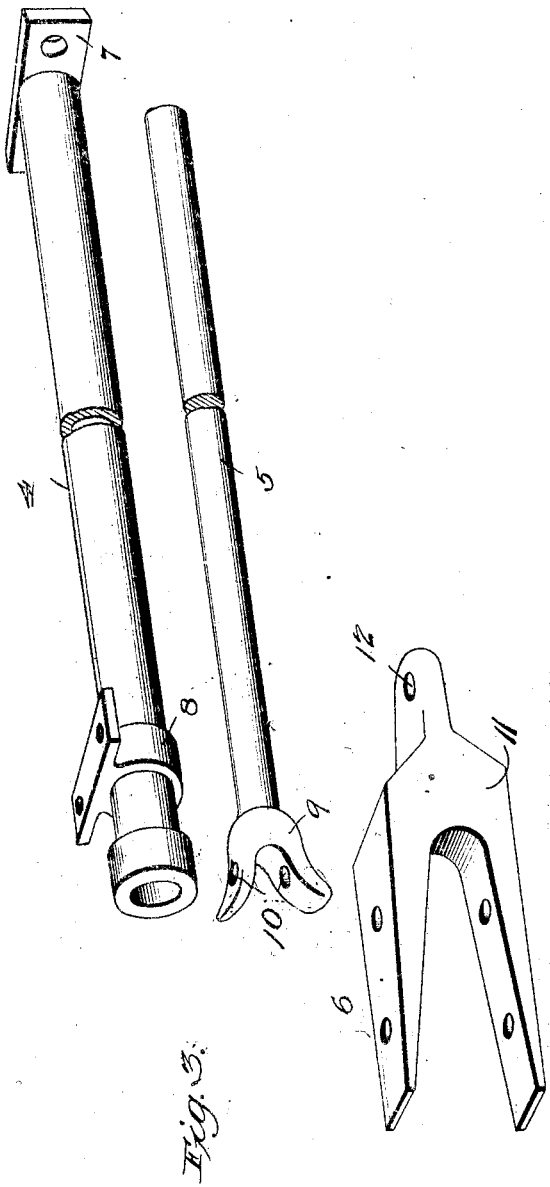
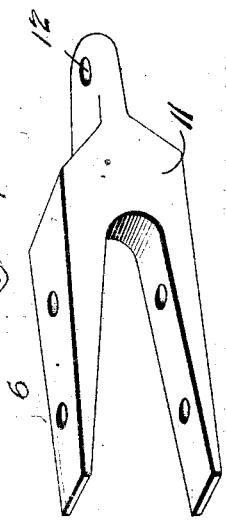

JOHN F. MORRIS, OF BAKERSFIELD, CALIFORNIA.

WAGON-COUPLING.

No. 905,736.   Specification of Letters Patent.   Patented Dec. 1, 1908.

Application filed February 23, 1907. Serial No. 358,809.

*To all whom it may concern:*

Be it known that I, JOHN FLETCHER MORRIS, citizen of the United States, residing at Bakersfield, in the county of Kern and State of California, have invented certain new and useful Improvements in Wagon-Couplings, of which the following is a specification.

My invention relates to wagon couplings; and it has for its object to provide a coupling designed to be used in company with a draft chain between a forward wagon and a rear or "trail" wagon, and constructed with a view of permitting of the forward wagon being moved a considerable distance before the "trail" wagon is started, as is desirable when the loads are heavy, and also constructed in such manner that is is adapted, irrespective of the distance between the wagons, to hold the "trail" wagon in the proper course or track and against casual wandering into the rough unbeaten part of a road.

To the attainment of the foregoing object the invention consists in the peculiar construction, novel combination and adaptation of parts hereinafter described and particularly pointed out in the claim appended.

In the accompanying drawings, forming part hereof: Figure 1 is a view illustrating a forward wagon and part of a rear or "trail" wagon connected together through the medium of my improvements. Fig. 2 is an enlarged longitudinal vertical section illustrative of the specific construction of my novel coupling. Fig. 3 comprises disconnected perspective views of the parts entering into the coupling.

Similar numerals designate corresponding parts in all of the views of the drawings, referring to which:

1 is the forward wagon of a train.

2 is the rear or "trail" wagon.

3 is the draft chain employed in the conventional manner intermediate the wagons, and 4, 5 and 6 are the members of my novel coupling. The forward coupling member 4 is made of metal in the form of a tube which is open at its rear end; and it is provided at its forward end with a flat T-head 7 which is designed to be bolted or otherwise fixedly connected to the rear axle of the forward wagon 1, as shown. From the said axle of the forward wagon 1, the tubular member 4 extends rearward, and at an intermediate point of its length it is connected through the medium of a hanger 8 to the rear portion of the body or box of said wagon. The intermediate coupling member 5 is a metal rod movable endwise in the forward tubular member 4, and this intermediate member is provided at its rear end with a bifurcated head 9, the arms of which are apertured, as indicated by 10. The rear coupling member 6 is a stub tongue or pole, preferably of tough wood, fixedly connected with the forward axle of the "trail" wagon 2 and provided at its forward end with a metallic fixture 11 in which is an aperture 12. This fixture 11 is designed to be positioned in the bifurcated head 9 of the intermediate member 5, and connected thereto by a bolt 13.

With the parts or members of my novel coupling arranged as illustrated relative to each other and the forward wagon and rear or "trail" wagon, it will be apparent that when the loads of the wagons are very heavy and it is necessary to lengthen the draft chain 3 so that the forward wagon may be put under way before the "trail" wagon is started, the "trail" wagon may be allowed to hang back almost the length of the intermediate or rod member 5, which in practice is about three feet long, and yet when both wagons are under way the coupling as a whole will retain the "trail" wagon in its proper course in the track of a road and against lateral wandering or deflection from the track into the rough, untraveled portion of the road. It will also be apparent that in addition to holding the "trail" wagon in the proper course in rear of the forward wagon irrespective of the distance between the wagons, my novel coupling will effectually prevent the "trail" wagon from approaching the forward wagon too closely or colliding with the same.

It will be gathered from the foregoing that my novel coupling in addition to being simple and inexpensive, is readily attachable to wagons at present in use as well as to new wagons, and is well adapted to withstand the rough usage to which wagon devices are ordinarily subjected.

I have particularly described the construction and relative arrangement of the parts comprised in this the present and preferred embodiment of my invention in order to impart a definite understanding of the said embodiment. I do not desire, however, to be understood as confining myself to the said specific construction and relative arrangement of parts as such changes or modifications may be made in practice as fairly fall within the scope of my invention as claimed.

Having described my invention what I claim and desire to secure by Letters Patent, is:

The combination in a wagon train, of a forward wagon, a rear wagon, a rod movable longitudinally and held against lateral movement on one wagon by which it is carried and coupled to the other wagon, and a flexible draft cable between the wagons, of sufficient length to remain slack and idle during the starting of the forward wagon and while said rod is moving longitudinally with respect to the wagon by which it is carried.

In testimony whereof I affix my signature in presence of two witnesses.

JOHN F. MORRIS.

Witnesses:
NATHAN L. BAKER,
JOHN ENAS.